Feb. 24, 1953   T. J. MULRANE   2,629,185
COLOR CHART

Filed Feb. 27, 1950   3 Sheets-Sheet 1

INVENTOR.
Thomas J. Mulrane
BY
his ATTORNEY

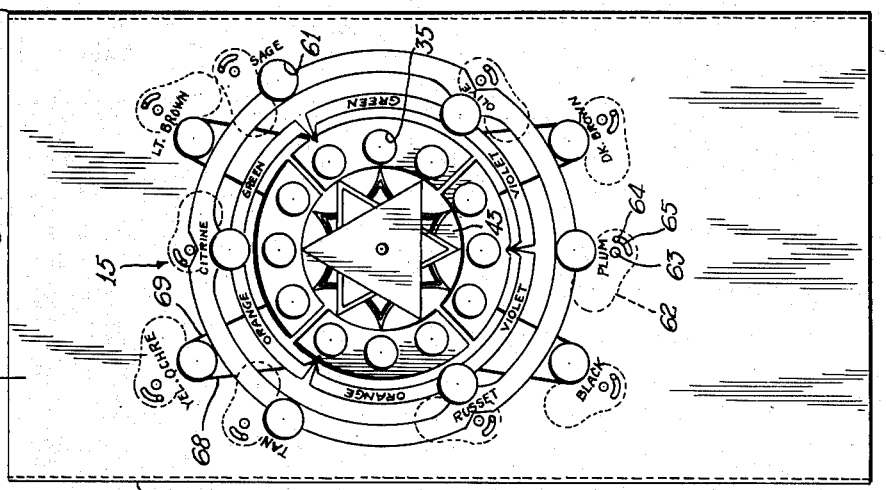
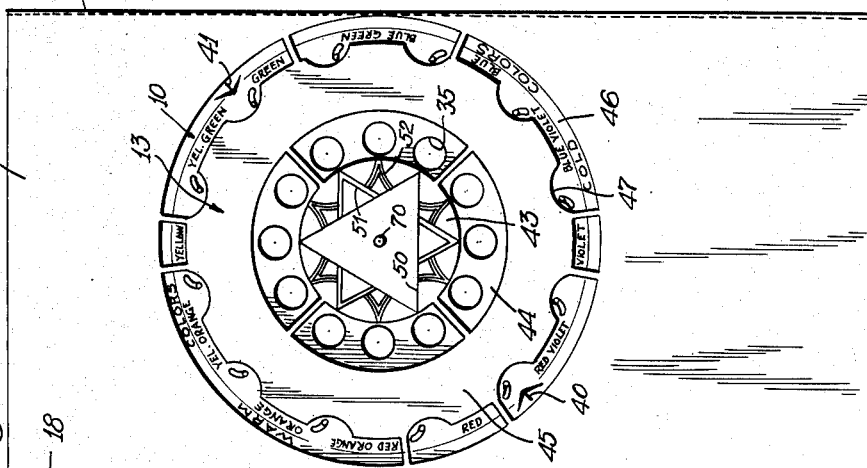
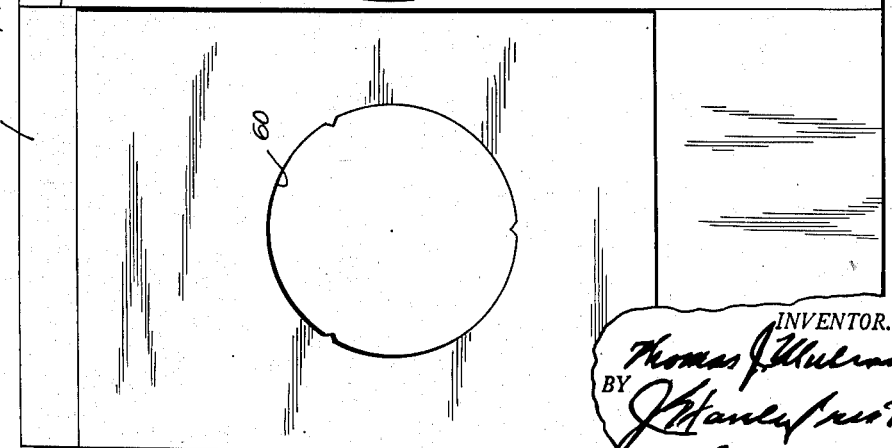

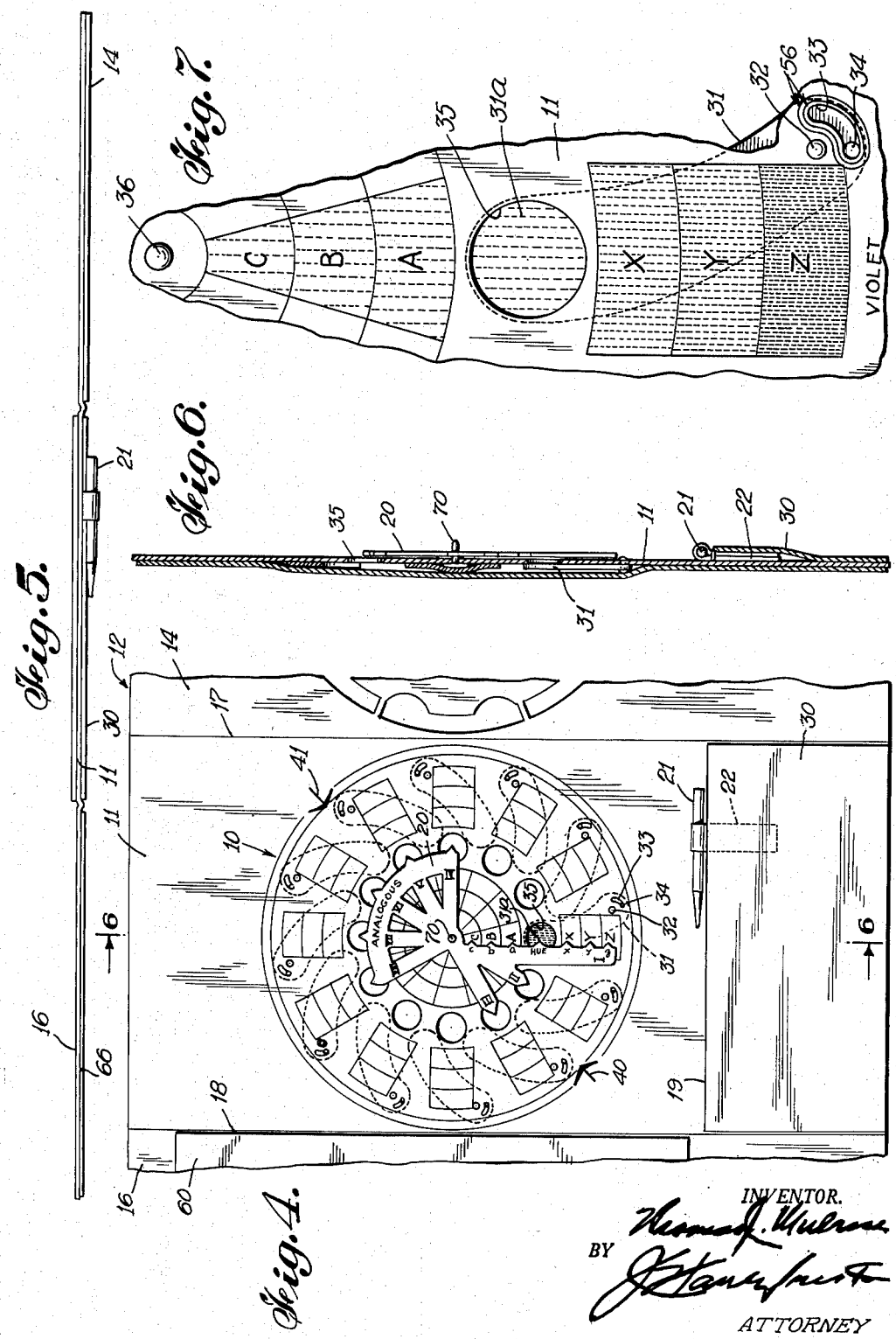

Patented Feb. 24, 1953

2,629,185

UNITED STATES PATENT OFFICE 2,629,185

COLOR CHART

Thomas J. Mulrane, Jersey City, N. J.

Application February 27, 1950, Serial No. 146,456

7 Claims. (Cl. 35—28.3)

This invention relates to a color chart for teaching, learning, and practicing the art and science of color and color combinations.

Color charts are well known to the prior art. Some of them are useful for teaching purposes, others are peculiarly adapted for use by students, and still others are designed for specific, limited uses, such as by artists, interior decorators, and house painters. The color charts which are designed for teaching purposes are also limited to the specific caliber and requirements of many groups of students. Thus color charts which are well adapted for use in schools of higher education are ill adapted for grade school use, and conversely color charts which are useful in teaching beginners are quite unsatisfactory and inadequate in regard to advanced students. Some of the color charts of the prior art perform the function of distinguishing colors, but they are unable to distinguish the shades and tints of colors.

The color chart herein described and claimed is a multi-purpose chart which is well adapted for use by all persons interested in color and color combinations, and it is equally well adapted for all of the uses to which color charts may be put. Thus it may serve one purpose and perform one function in the hands of one individual, and it may serve a completely different purpose and perform a completely different function in the hands of another person. The present color chart may be used by teachers and students in schools of every grade of education. Thus it may be used in grade or elementary schools for the purpose of teaching color and color combinations to beginners, and it may equally as well be used in schools of higher education in courses for advanced students. In addition to its use in schools, this color chart may be utilized by interior decorators, artists, house painters and the like in their every day practice of their respective professions and vocations.

An important feature of the color chart herein described and claimed is its masking feature whereby its more advanced or detailed aspects may be concealed from the view of elementary school students and other beginners in the field of color. Equally as important as what is exhibited to students, is what is not exhibited to them. A profusion of color tends to confuse rather than to instruct and the present color chart is as well adapted to conceal colors as it is to reveal them.

Another important feature of the present color chart, analogous to the first feature, is the feature whereby only those colors which are to be studied at any given moment may be exposed and all other colors concealed. Thus should it be desired to study or compare the primary colors only, said primary colors may be brought into view and all of the other colors retained in their normally concealed locations. Should it be desired, for example, to study only the secondary or only the intermediate colors, or only some of them, then the colors in question may be exposed and the remaining colors may be left in or returned to their unexposed positions. Again for example, all of the colors on the chart may simultaneously be exposed and then one or more of them may be concealed as and when desired.

Still another feature of the present color chart renders it possible to distinguish among the several colors and groups of colors, so that the primary colors, for example, may be distinguished from the secondary colors, and the secondary colors may be distinguished from the intermediate colors, and so on. Similarly, the several shades and tints of each color may be distinguished from each other, and the shades and tints of any one color may be distinguished from the shades and tints of the other colors. Combinations of colors and color harmonies may also be studied on this chart. Thus an indicator on the chart will point to all of the analogous colors of any one color. The very same indicator may designate:

1. Monochromatic color harmonies
2. Complementary harmonies
3. Split complementary harmonies
4. Double split complementary harmonies
5. Triadic color harmonies
6. Analogous color harmonies
7. Analogous color harmonies of three colors
8. Complementary analogous color harmonies of six colors
9. Complementary analogous color harmonies of four colors
10. Split complementary analogous color harmonies of seven colors
11. Split complementary analogous color harmonies of five colors
12. A combination of three complementary color harmonies with six colors.

The color chart which constitutes the present invention is, in reality, a composite of two color charts and one masking and indicating chart. These charts may be used either singly or in combination with each other, as desired, and as required. All three charts may be mounted on a common folder consisting of three panels, one chart to each panel. The color charts may be used either individually or in superimposed positions. The masking chart may be applied to either of the color charts or to both when they are in superimposed positions. In practice, however, it is applied to only one of said color charts or to both of them by being interposed between them. In the latter case, although it is used in connection with both color charts, it actually serves as a mask with respect to only one of them.

Each of the two color charts is provided with a plurality of color slides which are individually movable from concealed to exposed positions and from exposed to concealed positions. Cut-outs are provided in one of the color charts to expose the color slides of the other color chart. The mask is provided with cut-outs for a like purpose as well as for other purposes.

The color chart without the cut-out will herein be designated as the basic or principal color chart. The color chart which has a cut-out formed therein to expose the basic or principal color chart will herein be designated as the supplemental or color combinations chart. The principal or basic color chart may be used to teach the basic and elementary principles of color to student beginners. The supplemental or color combinations chart may be used in advanced courses to supplement the knowledge obtained from a study of the principal chart and to teach the principles of color combinations.

The principal color chart is provided with color slides illustrating the primary, secondary, and intermediate colors. The shades and tints of each of these colors are also provided on the principal chart. A distinction may also be made between warm and cold colors.

The masking and indicating chart may be superimposed upon the principal chart to conceal the shades and tints of the several colors therein shown. It also includes indicating means for distinguishing the three groups of colors aforementioned, to wit, the primary, secondary, and intermediate groups of colors.

The supplemental color chart may be superimposed either directly upon the principal color chart, or, if the masking chart is superimposed upon the principal color chart, said supplemental color chart may be superimposed upon said masking chart. The color slides of the supplemental color chart may illustrate the tertiary and quadrinary colors as well as combinations of secondary and intermediate colors. Since the supplemental color chart is provided with a cut-out to expose the color slides of the principal chart, it will be apparent that all of the color slides of both charts, or any of them, may be exposed and studied at the same time.

Another element of the present invention is the means for actuating or moving the color slides of the two color charts. In one preferred form of the invention, a stylus or pointer is used for that purpose.

Still another element of the present invention is an indicator whose principal use is in connection with the principal color chart. This indicator is provided with a plurality of indicating arms or pointers which are in fixed relation to each other. These pointers are adapted to designate the relationships which obtain among the several colors. One of the arms may be provided with a plurality of additional pointers which relate to the shades and tints of each color. This indicator is movably mounted relative to the principal color chart and it may be oriented with respect to any one of the several colors on said chart.

A final element of the present invention is a pocket wherein the movable indicator and the stylus may be kept when they are not in use. This pocket is provided in the folder in which the three charts aforementioned are themselves provided.

The foregoing is illustrated by the preferred form of the invention which is shown in the accompanying drawings. In these drawings, Fig. 1 is a plan view of the folder in which the three charts aforementioned are provided, said folder being shown in flat, open position, the face of the principal color chart being shown in the center of said folder, and the backs of the supplemental color chart and the masking chart being shown on both sides of said principal color chart.

Fig. 2 is a similar view showing the masking chart superimposed upon the principal color chart.

Fig. 3 shows the masking chart superimposed upon the principal color chart and the supplemental color chart superimposed upon the masking chart.

Fig. 4 shows the indicator on the principal color chart and it also shows the color slides movably mounted in said principal color chart.

Fig. 5 is an edge view of the open folder shown in Fig. 1.

Fig. 6 is a sectional view on the line 6—6 of Fig. 4.

Fig. 7 is an enlarged fragmentary view of the principal color chart, showing in detail one of the color slides and the shades and tints of the color on said color slide.

Figure 1:
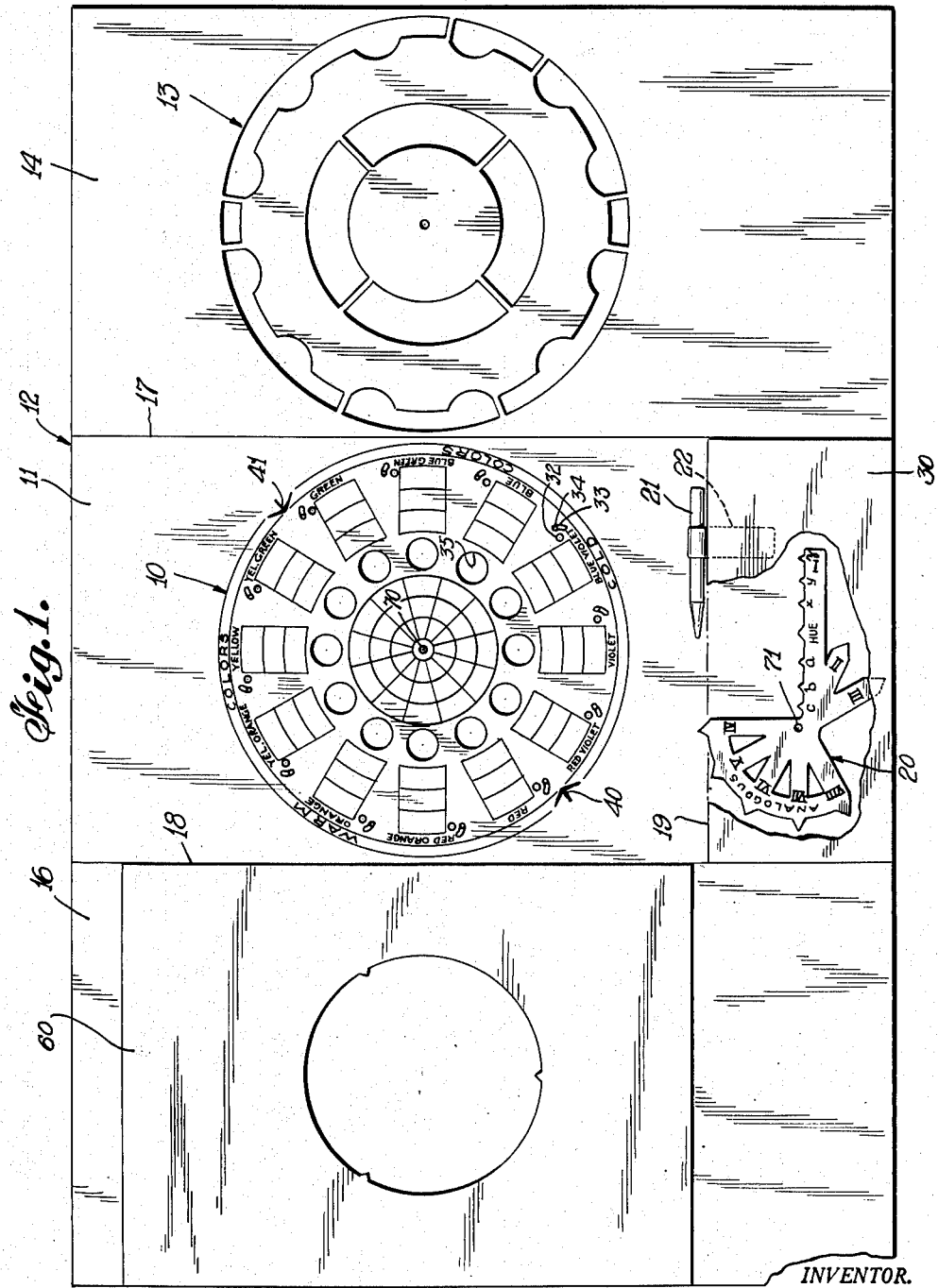

The principal color chart 10 in the preferred form of this invention is incorporated into the middle panel 11 of folder 12. The masking and indicating chart 13 is incorporated into one side panel 14 of said folder 12. The supplemental or color combinations chart 15 is incorporated in a second side panel 16 of said folder 12. Fold line 17 separates panels 11 and 14 from each other and fold line 18 separates panels 11 and 16 from each other. Since panel 11 is disposed between panels 14 and 16, the two latter panels 14 and 16 may be brought into superimposed positions relative to the former panel 11. Color chart 10 may be fully exposed as shown in Fig. 1 or it may be masked in part as shown in Fig. 2. Color chart 10 may also be fully exposed and used either alone or in combination with the other two charts as shown in Fig. 3. A pocket 19 may be provided on middle panel 11 to accommodate indicator 20 and stylus 21, or, more specifically, a strap 22 which is affixed to said stylus and which may be inserted into the pocket to hold the stylus in place on panel 11.

Chart 10 consists of fixed and movable elements. It is a circular chart and its fixed elements may be painted or printed upon, or in any other way applied to, the top surface of panel 11 as viewed in Fig. 1. The movable elements are mounted below the fixed elements and in the preferred embodiment of this invention, the movable elements are mounted between panel 11 and a backboard or panel 30. The space between panel 11 and backboard 30 is occupied by said movable elements in such manner that they may be moved therein from one position to another.

The movable elements of color chart 10 comprise a plurality of color slides 31, each of which is pivotally mounted between panel 11 and backboard 30 by means of a pin or rivet 32. They are thus movable between panel 11 and backboard 30 in a common plane which is parallel to the planes of said panel and said backboard. An arcuate slot 33 is formed in panel 11 adjacent each pivot 32 to expose a portion of the adjacent color slide 31, for actuation thereof. To actuate each slide, a hole 34 may be formed in the color slide in registration with a part of arcuate slot 33, and a stylus 21 may be inserted through arcuate slot 33 to engage hole 34 of the color slide 31 and said color slide may be caused to move angularly about pivot 32 by simply moving said stylus along said slot 33 in either direction.

The opposite or free end 31a of the color slide has a color either printed or painted thereon or in any other suitable manner applied thereto. Illustrative is the violet color shown in Fig. 7. When the color slide is in its position of Fig. 7, its colored portion 31a is exposed to view through a circular window 35 formed in panel 11. There is a plurality of such circular windows 35 formed in said panel 11, one for each colored slide 31, and these windows 35 are all arranged on a common circular line which is concentric with the circular chart 10 as a whole. By the same token, pivotal points 32 are also arranged on a common, concentric circular line. Thus any one color slide may be moved into view by simply engaging its hole 34 with a stylus 21 and moving said stylus along arcuate slot 33. When the stylus is moved in the opposite direction along said slot, the color slide will be removed from view.

The color shown on the color slide is the hue or middle value color. The low value shades of the color are provided on panel 11 between windows 35 and center point 36 of color chart 10. The high value tints of the color are provided on the same panel on the opposite side of window 35. Illustrative is Fig. 7. Color slide 31 in said Fig. 7 is colored violet. Between window 35 and center point 36 are three sections designated A, B, and C. Section A is colored to illustrate one shade of violet. Section B is colored to illustrate another shade of violet of lower value. Section C is colored to illustrate still another shade of violet of still lower value. On the opposite side of window 35 are three sections designated X, Y, and Z. The section designated as X is colored to illustrate a violet tint. Section Y is colored to illustrate another violet tint of higher value. Section Z is colored to illustrate a violet tint of still higher value. This arrangement of colors and color values applies to all of the color slides and their corresponding sections A, B and C, and X, Y and Z, so that the hues, shades and tints of the several colors may be studied on chart 10.

In the form of invention shown in the drawing, the following colors appear on the color slides of chart 10 in the following order, reading circumferentially in the clockwise direction: red, red-orange, orange, yellow-orange, yellow, yellow-green, green, blue-green, blue, blue-violet, violet, and red-violet.

The colors red, red-orange, orange, yellow-orange, yellow, and yellow-green are warm colors and they are so designated on chart 10. Green, blue-green, blue, blue-violet, violet, and red-violet are the cold colors, and they are so designated on chart 10. Arrows 40 and 41 separate the warm colors from the cold colors and each of these colors, warm and cold, is illustrated in sections A, B and C, and X, Y and Z in regard to its shades and tints.

Some of these colors are primary, some are secondary, and the rest are intermediate. When panel 14 is folded over upon panel 11, masking and indicating chart 13 becomes superimposed upon principal chart 10. See Fig. 2. This masking and indicating chart has a centrally disposed disc-shaped masking portion 43, an annular cut-out 44 encircling said disc-shaped masking portion 43, an annular masking portion 45 encircling said annular cut-out 44, and a second annular cut-out 46 encircling said annular masking portion 45. The disc-shaped masking portion 43 is adapted to cover and conceal shade sections A, B and C. Annular masking portion 45 is adapted to cover and conceal all tint sections X, Y and Z. It may be necessary to provide small cut-outs 47 along the peripheral edge of annular masking portion 45 to expose slots 33 aforementioned. Thus the color slides may be actuated in the manner above described even though masking and indicating chart 13 may be superimposed upon principal color chart 10. But although the hues of these colors may be exhibited through said masking chart, their shades and tints will remain concealed.

Disc-shaped masking portion 43 also includes certain indicia for designating the primary, secondary and intermediate colors on the principal color chart. Thus the three points of triangle 50 on disc-shaped masking portion 43 point to the three primary colors, red, yellow and blue. The three points of double-lined triangle 51 point to the three secondary colors, orange, green and violet. A six-pointed figure 52 on said disc-shaped masking portion 43 points to the six intermediate colors, red-orange, yellow-orange, yellow-green, blue-green, blue-violet, and red-violet.

If desired, another method of distinguishing the colors of these three groups may be employed with respect to principal color chart 10. A single circle may be applied around the arcuate slots of the three primary colors; a double circle 56 may be applied around the arcuate slots of the secondary colors, for example as illustrated in Fig. 7; and a triple circle may be applied around the arcuate slots of the intermediate colors. This arrangement of lines may find its counterpart in the three figures of the disc-shaped masking portion 43. Thus triangle 50 designating the primary colors may be made of single lines only, triangle 51 designating the secondary colors may be made of double lines and six-pointed figure 52 may be made of triple lines.

The supplemental color chart 15 may be superimposed upon the principal color chart 10 by simply folding panel 16 over upon panel 11. The masking and indicating chart 13 may or may not be interposed between the two color charts. Assuming, however, that the masking chart is interposed between the two color charts, it will be noted that the secondary color chart 15 is provided with a centrally disposed, circular cut-out 60 which exposes all of windows 35 of the principal color chart as well as the disc-shaped masking portion 43 of the masking chart.

Supplemental color chart 15 is provided with three groups of windows 61 which correspond to windows 35 above described except that they may, if desired, be somewhat larger. These three groups are disposed on three circular lines which are concentric with each other and with the circular lines on which windows 35 are disposed. More specifically, the inner ring of windows 61 is designated in Fig. 3 by the following color references: citrine, olive, and russet. The intermediate ring of windows 61 is designated by the color references: tan, sage and plum. The outer ring of windows 61 is designated by the color references: yellow-ochre, light brown, dark brown, and black. Corresponding to each window 61 is a color slide 62 mounted on a pivot 63 and having a hole 64 formed therein which is exposed through an arcuate slot 65. This arrangement corresponds to the color slide arrangement of chart 10 and as in chart 10, the color slides are disposed between panel 16 and a backboard or panel 66 behind said panel 16. Stylus 21 which may be utilized to actuate color slides 31 may also be used to actuate color slides 62, and in the same manner. Each color slide 62 is colored to correspond to the color reference adjacent that window 61 which is individual to it.

The outer ring of colors represents combinations of one secondary and one intermediate color, as follows:

Orange and yellow-orange=yellow-ochre
Yellow-green and green=light brown
Blue and blue-violet=dark brown
Red-violet and red=black It will be noted that each color in the outer ring is provided with a pair of indicating lines 68 and 69 respectively which point in the direction of the two colors on the principal color chart 10 which combine to produce it.

The inner ring of colors represents tertiary colors or combinations of secondary colors. Thus:

Orange and green=citrine
Green and violet=olive
Violet and orange=russet

It will be noted that the color citrine is situated on supplemental color chart 15 between the two colors orange and green on the principal color chart 10; that the color olive appears on the supplemental color chart 15 between the two colors green and violet on said principal chart 10; and that the color russet appears on the supplemental color chart 15 between the two colors orange and violet of the principal color chart 10. This arrangement facilitates studying and understanding of the color combinations mentioned.

The intermediate ring of colors represents quaternary colors or combinations of tertiary colors as follows:

Russet and citrine=tan
Citrine and olive=sage
Olive and russet=plum

Here, too, it will be noted that the arrangement of colors makes for readier understanding of the subject matter. Thus, the color tan is situated on the supplemental chart 15 between the two colors russet and citrine on the same color chart; sage is situated between citrine and olive; and plum is situated between olive and russet.

Indicator 20 is very useful when used conjointly with the principal color chart 10. In the center of the principal color chart is a pin 70 or the like and a hole 71 is provided on indicator 20 to accommodate said pin. The indicator may thereby be rotated on pin 70 relative to color chart 10. Indicator 20 is provided with a long arm marked I, and a plurality of shorter arms marked, respectively, II, III, IV, V, VI, VII, and VIII. The long arm is provided with a plurality of laterally extending points marked, respectively, $c$, $b$, $a$, hue, $x$, $y$, and $z$. These points are so disposed on the long arm I, that when the long arm extends across a group of colored sections C, B, A, Hue, X, Y, and Z, the points fall on the respectively similarly lettered sections as will be understood from Fig. 4. The several arms of indicator 20 are positioned relative to each other as follows: Arms I and VII are diametrically opposite each other. Reading counter-clockwise, arm VIII is immediately adjacent arm VII, being spaced therefrom the distance between adjacent colors on the principal color chart 10. Reading clockwise, arm VI is adjacent arm VII, arm V is adjacent arm VI, and arm IV is adjacent arm V, all of these arms being spaced from each other the angular distance between adjacent colors on said principal color chart. Continuing to read in clockwise direction, arm II is adjacent arm I and arm III is adjacent arm II, again the spacing being equivalent to the spacing between adjacent colors on the principal color chart.

The following color harmonies then may be indicated by placing the indicator on color chart 10 and orienting it with respect to any of the colors on said color chart:

1. By placing the long arm I which may be described as the monochromatic arm, on any color, to produce monochromatic color harmonies as indicated by the small pointers marked $c$, $b$, $a$, hue, $x$, $y$, and $z$.

2. By placing short arm II on any color the following color harmonies relative to that color are indicated:

a. Complementary harmony (arms II—VI)
b. Split complementary harmony (arms II—V—VII)
c. Double split complementary harmony (arms I—III—V—VII)
d. Triadic color harmony (arms II—IV—VIII)
e. Analogous color harmony of five colors (arms IV—V—VI—VII—VIII)
f. Analogous color harmony of three colors (arms I—II—III)
g. Complementary analogous harmony of six colors (arms II—IV—V—VI—VII—VIII)
h. Complementary analogous harmony of four colors (arms II—V—VI—VII)
i. Split complementary analogous harmony of seven colors (arms I—III—IV—V—VI—VII—VIII)
j. Split complementary analogous harmony of five colors (arms I—III—V—VI—VII)
k. A combination of three complementary color harmonies with six colors (arms I—II—III—V—VI—VII)

It will be understood that this invention is not limited to the details of construction and operation described above and shown in the drawing except as it appears hereinafter in the claims, and that the claims are intended to include not only the elements specifically mentioned in them, but the equivalents of those elements also.

The invention claimed is as follows:

1. A color chart having a plurality of windows and a plurality of color slides, the number of said slides being equal to the number of said plurality of windows, one of said slides being allocated to each of said windows, each of said slides being movable into and out of registration with its respective window where the slide is exposed to view through the window, and each of said slides being so movable individually and independently of other of said slides, and a group of colored sections adjacent each of said windows, each of said groups of colored sections showing shades and tints of the color of the color slide allocated to the window to which the respective group of sections is adjacent.

2. A color chart having a plurality of windows formed therein and a plurality of color slides which are individually movable into and out of registration with said windows, and a second color chart which is also provided with a plurality of windows formed therein and a plurality of color slides which are individually movable into and out of registration with said windows, said second color chart being connected to the first color chart and movable into registration therewith, and having an opening formed therein which exposes the windows of the first color chart.

3. A color chart having a plurality of windows formed therein and a plurality of color slides which are individually movable into and out of registration with said windows, said windows being arranged on a common circular line, each of said windows being provided on both sides of said circular line and radially thereof, with a plurality of colored sections showing the shades and tints of the color on the color slide which is movable into and out of registration with said window.

4. A color chart in accordance with claim 3, having a plurality of masking charts connected thereto and movable into registration therewith simultaneously, said masking charts being provided with masking portions which are registrable with the colored sections of the color chart to mask the same, and being provided with a cut-out which is registrable with the windows of the color chart to expose the same.

5. A color chart in accordance with claim 4, having a second color chart connected thereto and movable into registration with the first color chart and the masking chart when said masking chart is in registration with the first color chart, said second color chart having a cut-out formed therein which exposes the windows of the first color chart.

6. A color chart in accordance with claim 5, wherein the second color chart is provided with a plurality of windows formed therein and a plurality of color slides which are individually movable into and out of registration with said windows.

7. A color chart having a plurality of windows formed therein and a plurality of color slides which are individually movable into and out of registration with said windows, said windows being arranged on a common circular line, each of said windows being provided on both sides of said circular line and radially thereof, with a plurality of colored sections showing the shades and tints of the color on the color slide which is movable into and out of registration with said window, said colored sections of each colored slide being disposed as a group on a radial line, and an indicator pivotally mounted on said color chart centrally of said circular line, said indicator being provided with a plurality of radially extending pointers which point in the direction of the windows of said color chart and which show the relationship among the several colors of the color slides, one of said radial pointers being provided with a plurality of laterally extending pointers removed from said pivot which simultaneously relate to the colored sections of one of said groups.

THOMAS J. MULRANE.

REFERENCES CITED

The following references are of record in the file of this patent:

UNITED STATES PATENTS

| Number | Name | Date |
| --- | --- | --- |
| Re. 13,358 | Wagner | Jan. 9, 1912 |
| 1,964,260 | Jones | June 26, 1934 |
| 1,964,586 | Leland | June 26, 1934 |
| 2,120,499 | Mackay | June 14, 1938 |
| 2,196,397 | McDonald | Apr. 19, 1940 |
| 2,201,888 | Deutsch | May 21, 1940 |
| 2,238,316 | Gaugher | Apr. 15, 1941 |